United States Patent
Chen et al.

(10) Patent No.: US 10,681,087 B2
(45) Date of Patent: *Jun. 9, 2020

(54) METHOD OF MANAGING SYSTEM UTILITIES ACCESS CONTROL

(71) Applicant: Red Hat, Inc., Raleigh, NC (US)

(72) Inventors: Huamin Chen, Westborough, MA (US); Bradley Childs, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,641

(22) Filed: Jan. 10, 2019

(65) Prior Publication Data

US 2019/0166163 A1 May 30, 2019

Related U.S. Application Data

(63) Continuation of application No. 15/277,048, filed on Sep. 27, 2016, now Pat. No. 10,182,076.

(51) Int. Cl.
*H04L 29/06* (2006.01)

(52) U.S. Cl.
CPC ............ *H04L 63/20* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 7,882,227 B2 * | 2/2011 | Faden | G06F 21/6236 709/201 |
| 8,312,043 B2 | 11/2012 | van Riel et al. | |
| 9,075,818 B2 | 7/2015 | Cavage et al. | |
| 9,104,456 B2 | 8/2015 | Pacheco et al. | |
| 9,122,562 B1 | 9/2015 | Stickle | |
| 2010/0132013 A1 * | 5/2010 | van Riel | G06F 21/53 726/1 |

(Continued)

OTHER PUBLICATIONS

Introduction to Container Security, Whitepaper, Mar. 18, 2015, Link: https://www.docker.com/sites/default/files/WP_Intro%20to%20container%20security_03.20.2015%20(1).pdf (8 pages).

(Continued)

*Primary Examiner* — Joseph P Hirl
*Assistant Examiner* — Hassan Saadoun
(74) *Attorney, Agent, or Firm* — K&L Gates LLP (57) ABSTRACT

An access control system includes a memory, a processor, a host operating system (OS) executing on the processor, a container on the host OS, and a security manager running on the host OS. The container has a set of access control rules and includes a containerized utility. The security manager receives a request to run the utility to complete a transaction, retrieves credentials associated with the user, and determines a status of the credentials. The status of the credentials is privileged if the credentials are included in the set of access control rules and is non-privileged if the credentials are not included in the access control rules. Responsive to determining the status as privileged, the security manager executes an RBD command for the transaction to obtain a target RBD image, retrieves the target RBD image, and records the transaction.

20 Claims, 5 Drawing Sheets

(56) References Cited

U.S. PATENT DOCUMENTS

2016/0044035 A1    2/2016  Huang

OTHER PUBLICATIONS

Docker Secure Deployment Guidelines, 2016, Link: https://github.com/GDSSecurity/Docker-Secure-Deployment-Guidelines (6 pages).
Hertz, Jesse, Abusing Privileged and Unprivileged Linux Containers, NCC Group, 2016 (52 pages).
Negus, Chris, Red Hat Enterprise Linux Atomic Host 7 Getting Started with Containers, 2016, Link: https://access.redhat.com/documentation/en/red-hat-enterprise-linux-atomic-host/version-7/getting-started-with-containers/ (219 pages).

* cited by examiner

METHOD OF MANAGING SYSTEM UTILITIES ACCESS CONTROL

CROSS REFERENCES TO RELATED APPLICATIONS

This application is a continuation of and claims priority to and the benefit of U.S. patent application Ser. No. 15/277,048, filed on Sep. 27, 2016, now U.S. Pat. No. 10,182,076, the entire content of which is hereby incorporated by reference.

BACKGROUND

Rados Block Device ("RBD") software facilitates the storage of block-based data by breaking up block-based application data into smaller units that may be stored as objects. An example storage system is the Ceph open source distribution storage system. For example, objects may be stored in virtual block devices throughout a Ceph storage cluster. Block devices may be the virtual equivalent to a physical disk drive. When adding a block device to a node, an image may be created for the block device. Images may be created in the Ceph storage cluster, and these images (e.g., RBD Images) can store data. For example, data may be saved to an image and information may be retrieved from the image. Generally, images have a specified size and format, which may specify which object layout to use.

Systems using RBD storage may include multiple-tenant environments that include multiple containers being accessed by several different users. Each container may include specific utilities or applications to perform different functions on or for the system.

SUMMARY

The present disclosure provides new and innovative systems and methods of managing system utilities access control. In an example embodiment, a system includes a memory, at least one processor in communication with the memory, a host operating system (OS) executing on the at least one processor, a container on the host OS, and a security manager running on the host OS. The container has a set of access control rules and includes a containerized utility. The security manager is configured to receive a request from a user to run the containerized utility to complete a transaction, retrieve credentials associated with the user, and determine a status of the credentials as either privileged or non-privileged. The status of the credentials is privileged if the credentials are included in the set of access control rules, and the status of the credentials is non-privileged if the credentials are not included in the set of access control rules. Responsive to determining the status as privileged, the security manager is further configured to execute a rados block device (RBD) command for the transaction to obtain a target RBD image, retrieve the target RBD image, and record the transaction.

In an example embodiment, a method includes receiving, by a host OS, a container having a set of access control rules. The container includes a containerized utility. The security manger running on the host OS receives a request from a user to run the containerized utility to complete a transaction and retrieves credentials associated with the user. Then, the security manager determines a status of the credentials of the user as one of privileged and non-privileged. The status of the credentials of the user is privileged if the credentials are included in the set of access control rules, and the status of the credentials of the user is non-privileged if the credentials are not included in the set of access control rules. Responsive to determining the status as privileged, the security manager executes an RBD command for the transaction to obtain a target RBD image. Responsive to executing the RBD command, the security manager retrieves the target RBD image and records the transaction.

In an example embodiment, a non-transitory machine readable medium storing a program, which when executed by a processor, causes a security manager to receive a request from a user to run the containerized utility to complete a transaction. The container on a host OS includes the containerized utility. The security manager is further caused to retrieve credentials associated with the user and determine a status of the credentials of the user as one of privileged and non-privileged. The status of the credentials of the user is privileged if the credentials are included in the set of access control rules, and the status of the credentials of the user is non-privileged if the credentials are not included in the set of access control rules. Responsive to determining the status as privileged, the machine readable medium causes the security manager to execute an RBD command for the transaction to obtain a target RBD image. Responsive to executing the RBD command, the machine readable medium causes the security manager to retrieve the target RBD image and record the transaction.

Additional features and advantages of the disclosed methods and systems are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

The present disclosure provides new and innovative systems and methods of managing system utilities access control in a multi-tenant environment. Computer systems may use containers to separate various components of a computing system. For example, different components of a computing system may be executed at different containers and/or virtual machines executing on a computing device. Different utilities, applications, and/or processes may be executed in a container. Typically, when a system creates a container, it may mount or bind an RBD image to the container and format the image for the appropriate file system (e.g., fourth extended file system ext4), which may mandate the host operating system (host OS) to install both mount and format utilities. In some cases, a privileged container may be able to access RBD images that belong to other containers and may even be able to execute the host OS's format utility to format the RBD images in other containers, which creates a security risk. Previous techniques to mitigate such a security risk include using sophisticated rule sets to lock certain components or utilities within containers. However, these techniques require additional overhead and frequent security checks and/or user authentication checks. For example, one such technique includes setting proper labels for data structures, such as SELinux labels. However, SELinux usually assigns the same label to objects belonging to the same resource group, and as a result, once a user in a container gains access to one RBD device, the same user may be granted access to all RBD devices, which may create a security risk. For example, the computer system may not want a user to be granted access to all RBD devices. Additionally, SELinux does not have tracking capabilities, which may prevent the system from monitoring a user's activities and/or usage profiles. The inability to track a user's activity or usage profiles may prevent the system from taking additional actions to increase security.

As discussed in the various example embodiments disclosed herein, to increase security and reduce overhead, a security manager such as a daemon process may be used to establish trust based on each container. For example, containers may be established with predefined settings that designate which users are privileged and which users are not privileged. This advantageously reduces the amount of security checks needed in the system. For example, instead of running a security check each time a user tries to access a file or execute a command, the security check may be applied to which containers a user may execute. Authenticating a user for an entire container may enable the user to execute future commands within the container without requiring an additional security check, which advantageously reduces overhead for the system. For example, system utilities may be containerized and a security manager may decide if a user process or a user container can run a containerized system utility, thereby advantageously improving security (e.g., security of accessing isolated resources in a multi-tenant environment such as OpenShift) of the system without a significant increase in system overhead. Additionally, the embodiments disclosed herein advantageously mitigate the risk for use cases where resources in the same category need to be distinguishable from multiple tenants.

As used herein, "containerize" means to implement on a container. The system may containerize the system utilities using an assortment of container tools including Docker, Rocket, RunC, etc. Containers may be used for utilities that perform specific function. For example, a container may include containerized utilities to format a specific file system type. Additionally, a container may include one or more applications, portions of applications, or utilities.

Figure 1:
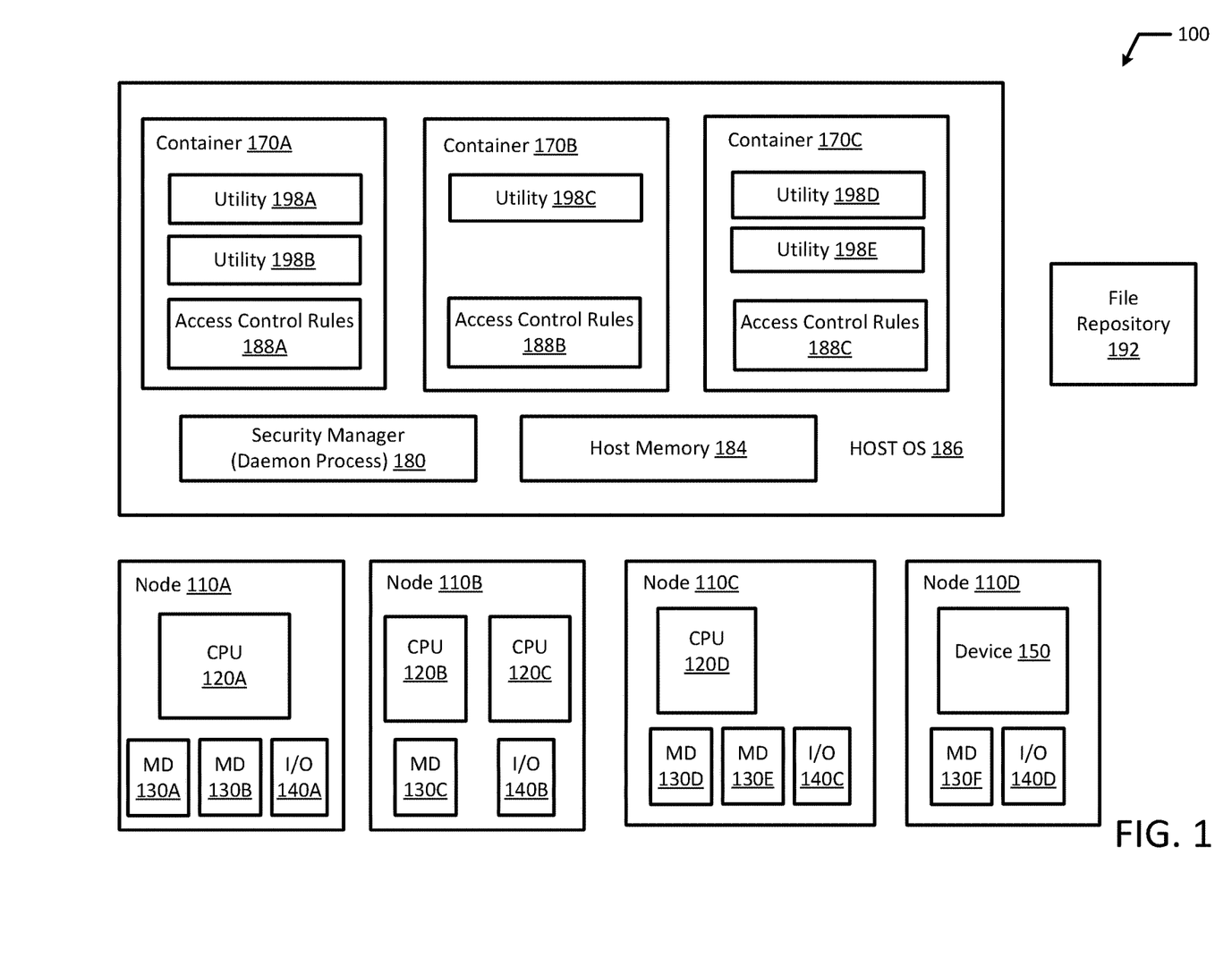
FIG. 1 illustrates a block diagram of an example multi-processor computer system according to an example embodiment of the present disclosure.

FIG. 1 depicts a high-level component diagram of an example multiprocessor computer system 100 in accordance with one or more aspects of the present disclosure. The multiprocessor computer system 100 may include a memory (e.g., MD 130A-F), one or more physical processors in communication with the memory (e.g., CPU 120A-D), and a host OS 186.

The host OS 186 (e.g., Windows, Linux, Solaris, etc.) may include host memory 184, a security manager 180, and at least one container (e.g., container 170A-C). Each container may include one or more containerized utilities (e.g., Utility 198A-E) and a set of access control rules (e.g., Access Control Rules 188A-C). A container (e.g., container 170A-C) may be executed within a virtual machine or a physical machine. Additionally, a container (e.g., container 170A-C) may be configured to execute utilities, applications, and/or processes. Different components of a computing system may be executed at different containers. For example, a container (e.g., container 170A-C) may include utilities to format a specific file system.

A container (e.g., container 170A-C) may be a virtualized object similar to a virtual machine except that a container 170A-C may not implement separate guest OSs and may, for example, instead utilize the host OS 186 of a physical machine. Applications and/or utilities (e.g., utility 198A-E) may execute in the respective containers (e.g., container 170A-C). The containers (e.g., container 170A-C) may each have one or more respective, filesystems, memory, devices, network ports, etc. for accessing the physical resources of the physical machine and other resources outside of the physical machine. Specific requests to access physical resources of or outside of the physical machine may be made through the host OS 186.

In an example, the multiprocessor computer system 100 may include a file repository 192. The file repository 192 may be hosted on a cloud or on a host machine. For example, the file repository 192 may be on the same host machine as the security manager 180. In another example, the file repository 192 may be on a different host machine. The file repository 192 may store RBD images and/or other data. In an example, there may be multiple file repositories. For example, file repositories may be container specific such that file repository 192 is associated with container 170A. Additionally, the file repository 192 may be associated with multiple containers (e.g., containers 170A-C).

The multiprocessor computer system 100 may include one or more interconnected nodes 110A-C. Each node 110A-C may in turn include one or more physical processors (e.g., CPU 120A-D) communicatively coupled to memory devices (e.g., MD 130A-E) and input/output devices (e.g., I/O 140A-C). Node 110D may include a device 150 such as an assigned device or a hardware device. In an example, a hardware device and/or an assigned device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The node 110D may include one or more physical processors communicatively coupled to memory devices (e.g., MD 130F) and input/output devices (e.g., I/O 140D).

As used herein, a physical processor or a processor 120A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-F refers to a volatile or non-volatile memory device, such as RAM, ROM, EEPROM, or any other device capable of storing data. Also, as discussed herein, I/O device 140A-D refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node and/or between nodes, including the connections between a processor 120A-D and a memory device 130A-F and between a processor 120A-D and an I/O device 140A-D, may be provided by one or more local buses of suitable architecture, for example, peripheral component interconnect (PCI).

Figure 2A:
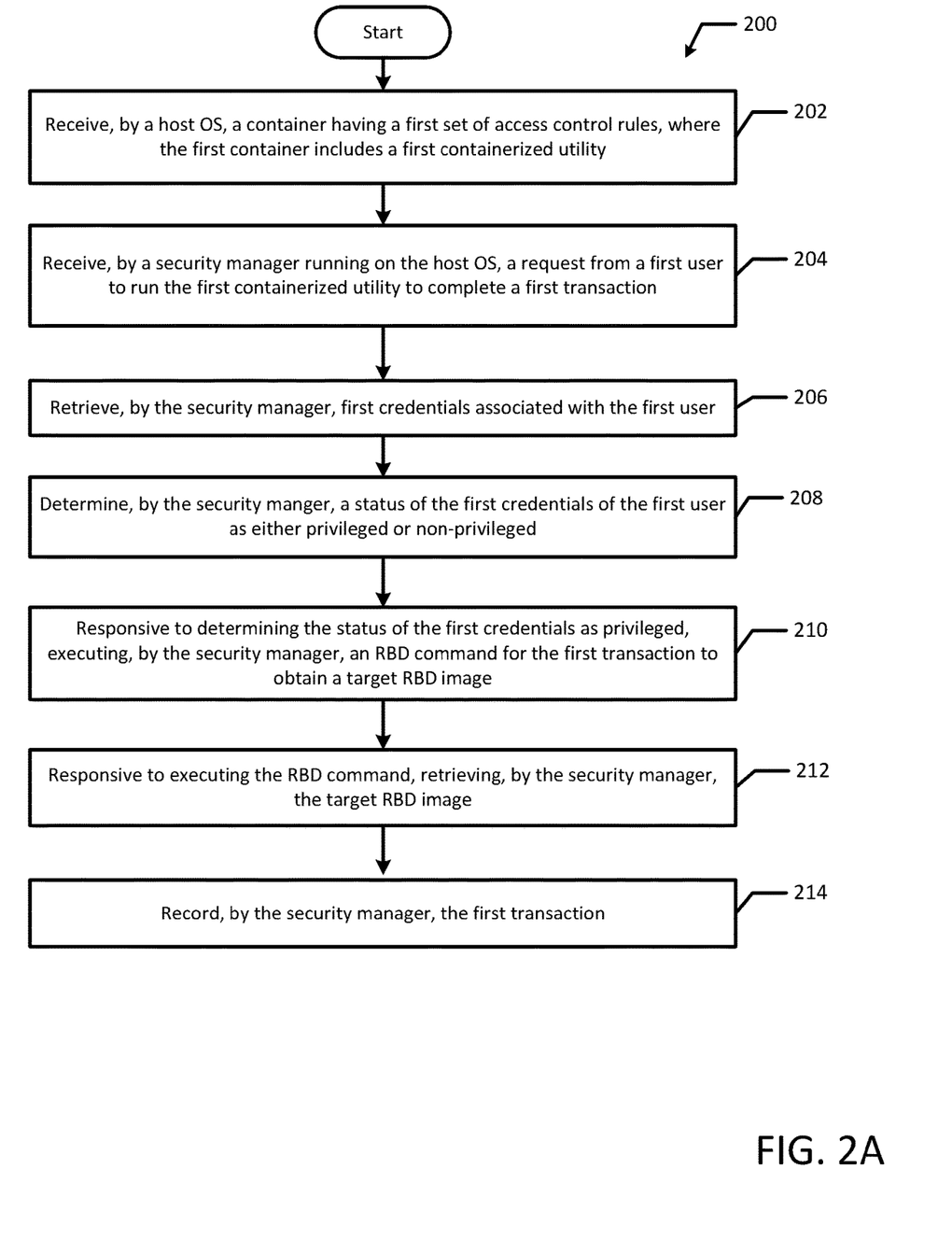
FIG. 2A illustrates a flowchart of an example access control process according to an example embodiment of the present disclosure.
Figure 2B:
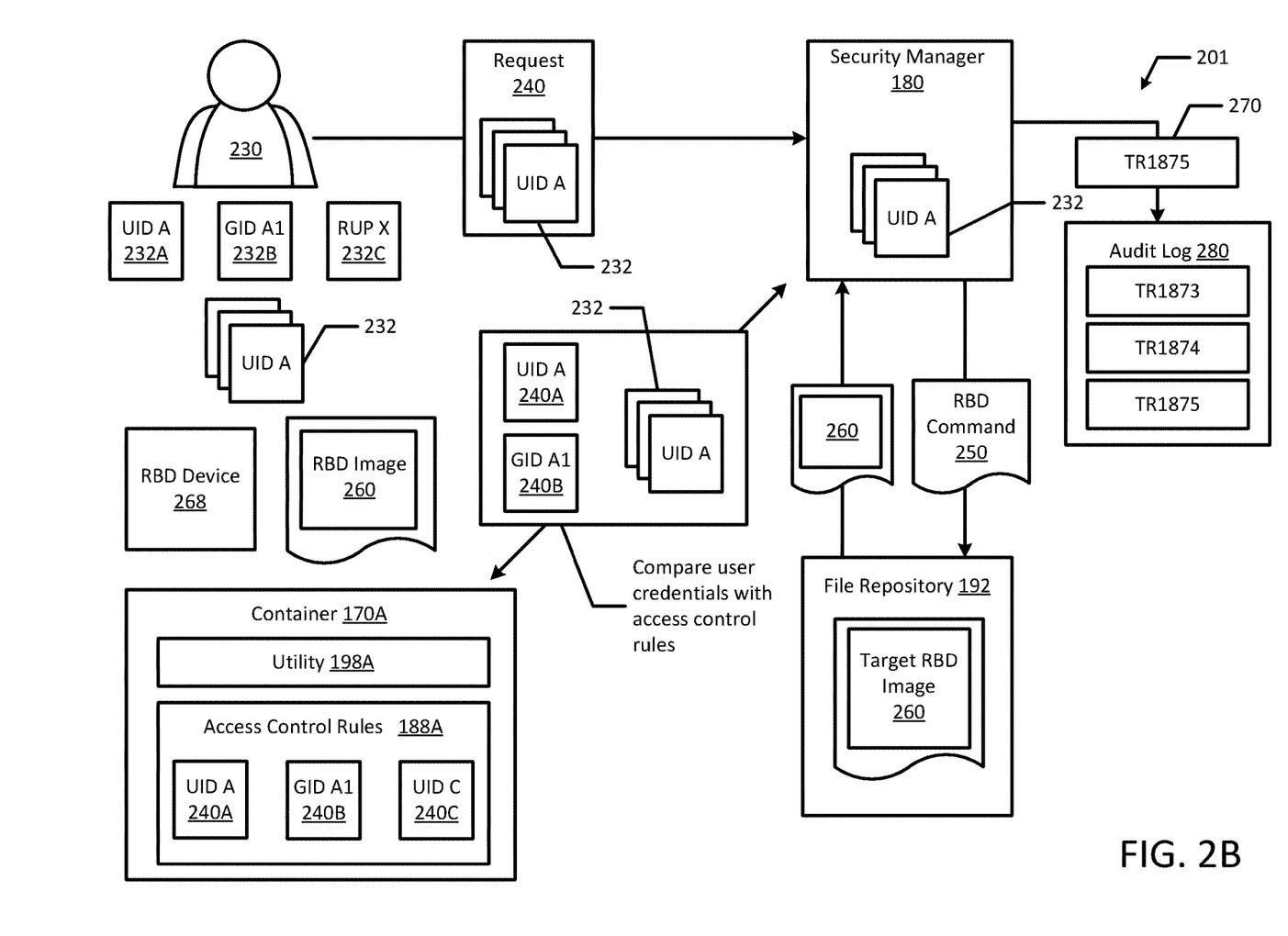
FIG. 2B illustrates a block diagram of an example access control process according to an example embodiment of the present disclosure.

FIG. 2B illustrates a block diagram of an example access control process 201 associated with example method 200 and FIG. 2A illustrates a flowchart of an example method 200 for access control in accordance with an example embodiment of the present disclosure. Although the example method 200 is described with reference to the block diagram illustrated in FIG. 2A and the flowchart illustrated in FIG. 2B, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may include hardware (circuitry, dedicated logic, etc.), software, or a combination of both.

The example method 200 includes receiving a container having a first set of access control rules, where the first container includes a first containerized utility. (block 202). For example, a host OS 184 may receive a container 170A having a first set of access control rules 188A. The first set of access control rules 188A may grant access to a user 230 with a specific user ID, group ID, or a resource usage profile. For example, access control rules 188A may define User A (e.g., UID A 240A), Group A1 (e.g., GID A1 240B), and User C (e.g., UID C 240C) as privileged users. In the illustrated example, the user 230 has a user ID 232A (e.g., UID A), a group ID 232B (e.g., GID A1), and a resource usage profile 232C (e.g., RUP X). Additionally, for example, the container 170A may include a first containerized utility 198A. In an example, the container 170A may include multiple containerized utilities (e.g., utility 198A-B). In another example, the container 170A may include a single utility (e.g., utility 198A). For example, the first containerized utility 198A may be used to format a specific file system type.

Then, a security manager running on the host OS may receive a request from a first user to run the first containerized utility to complete a first transaction (block 204). For example, a security manager 180 running on the host OS 186 may receive a request 240 from the first user 230 to run the first containerized utility 198A to complete a first transaction. For example, the request 240 may be to format an RBD device 268. The RBD device may be an external device, such as a USB mass storage device. Additionally, the RBD device may be another device associated with network storage. In an example, the security manager 180 may be a daemon process. In an example, the security manager 180 may receive the request 240 in response to the first user 230 accessing an RBD image 260. In another example, the request 240 may be received from the first user 230 in response to the host OS 186 issuing the request 240 to the security manager 180. Additionally, the request 240 may be received when the first user 230 attempts to run a command (e.g., RBD command 250). For example, the request may be included in a shell script. Additionally, receiving the request 240 from the first user 230 may include, responsive to the first user 230 attempting to execute a command (e.g., RBD command 250) inside the first container 170A, intercepting the request associated with the attempt. For example, the security manager 180 may intercept the request associated with the attempt before the request is completed.

Next, the security manager may retrieve first credentials associated with the first user (block 206). For example, the security manager 180 may retrieve first credentials 232 associated with the first user 230. In an example, the first credentials include at least one of a user ID 232A, a group ID 232B, and a resource usage profile 232C. In the illustrated example, the user 230 has a user ID 232A (e.g., UID A), a group ID 232B (e.g., GID A1), and a resource usage profile 232C (e.g., RUP X). In an example, the first credentials 232 may be container specific. For example, some containers may only require a user ID 232A (e.g., UID A) while others may require a group ID 232B (e.g., GID A1) for a user 230 to be authenticated against the access control rules 188A. In another example, a container may require a resource usage profile 232C (e.g., RUP X) for a user 230 to be authenticated against the access control rules 188A. In other examples, a combination of the first credentials 232 may be used. Additionally, the container 170A may use additional identifiers in the access control rules 188A.

The security manager may determine a status of the first credentials of the first user as either privileged or non-privileged (block 208). For example, the security manager 180 may determine a status of the first credentials 232 of the first user 230 as privileged or non-privileged. In an example, the status of the first credentials 232 of the first user 230 is privileged if one or more of the first credentials 230 are included in the first set of access control rules 188A. Additionally, the status of the first credentials 232 of the first user 230 is non-privileged if the first credentials 232 are not included in the first set of access control rules 188A. In the illustrated example, the access control rules 188A include UID 240 (e.g., "user ID A"), GID 240B (e.g., "group ID A1"), and UID 240C (e.g., "user ID C") as privileged users. For example, users associated with a "user ID A" and "user ID C" may be authenticated to execute containerized utilities (e.g., utility 198A) in container 170A. Additionally, users that are part of group A1 having a "group ID A1" may also be authenticated to execute containerized utility 198A in container 170A. In an example, the security manager 180 may only need to match a single credential 232 with the access control rules 188A in order to authenticate the user 230. In another example, the security manager 180 may need to match multiple credentials 232 (e.g., user ID and group ID) in order to authenticate the user 230. Comparing credentials 232 associated with the user 230 against access control rules 188A advantageously increases system security.

In an example, the security manager 180 may track credentials 232 and/or access control rules 188A. For example, the security manager 180 may track a user's resource usage profile 232C. In an example, a user may be limited access to a container if they exceed a specified amount of CPU or memory usage, which advantageously allows for system optimization.

Then, responsive to determining the status of the first credentials as privileged, the security manager may execute an RBD command for the first transaction to obtain a target RBD image (block 210). For example, the security manager 180 may execute an RBD command 250 for the first transaction to obtain the target RBD image 260. Once the user is authenticated, the user may execute commands within the container without the need for additional security checks for containerized utilities within the container, thereby advantageously reducing system overhead needed using previous techniques that may require a security check each time a user tries to execute a utility. In an example, responsive to determining the status of the first credentials 232 as non-privileged, the security manager 180 may prevent execution of the RBD command 250 for the first transaction. In another example, executing the RBD command 250 may include validating that a target RBD device 268 belongs to the first user. For example, the security manager 180 may validate that the target RBD device 268 belongs to the first user (e.g., credentials 232 match access control rules 188A). In an example, the RBD device 268 may be an external device, such as a USB mass storage device. Additionally, the RBD device 268 may be another device associated with network storage. Also, responsive to executing the RBD command, the security manager may retrieve the target RBD image (block 212). For example, the security manager 180 may retrieve the target RBD image 260 from a file repository 192. The file repository 192 may be hosted in a cloud. Additionally, the file repository 192 may be on a host machine. In another example, the security manager 180 may build the target RBD image 260 from system cache.

Lastly, the security manager may record the first transaction (block 214). For example, the security manager 180 may record the first transaction 270 (e.g., TR1875). In an example, the security manger 180 may record the first transaction 270 in an audit log 280. In the event a non-privileged user 230 attempts to access an unauthorized or restricted containerized utility, the security manager 180 may record or log the attempt. For example, the security manager 180 may record the unauthorized access attempt in the audit log 280. Additionally, the security manager 180 may use the record to blacklist the user and prevent subsequent access from the same user, which advantageously reduces future security threats from an unauthorized user.

Figure 3:
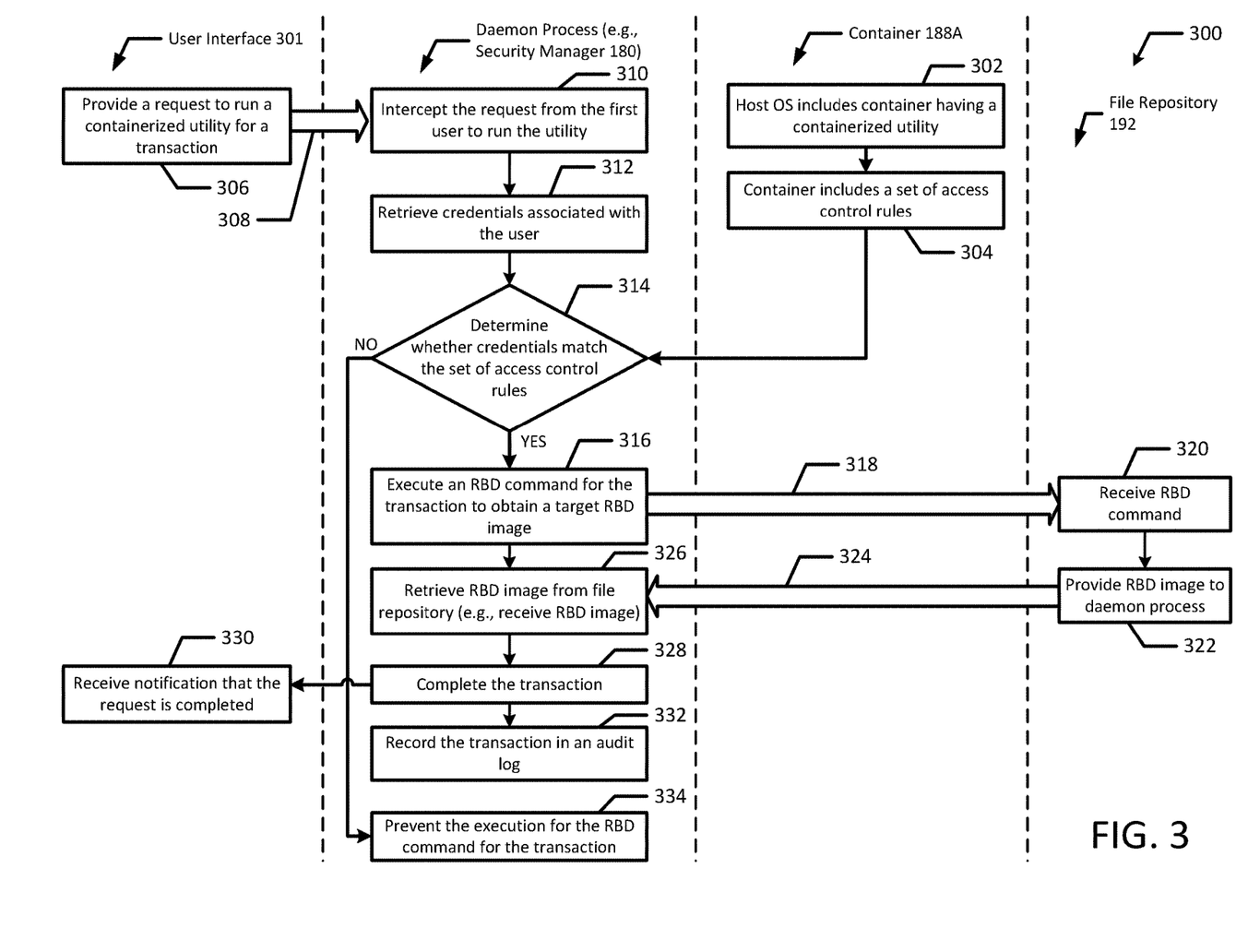
FIG. 3 illustrates a flow diagram of an example access control process according to an example embodiment of the present disclosure.

FIG. 3 depicts a flow diagram illustrating an example method 300 for access control according to an example embodiment of the present disclosure. Although the example method 300 is described with reference to the flow diagram illustrated in FIG. 3, it will be appreciated that many other methods of performing the acts associated with the method may be used. For example, the order of some of the blocks may be changed, certain blocks may be combined with other blocks, and some of the blocks described are optional. The method may be performed by processing logic that may include (e.g., circuitry, dedicated logic, etc.), software, or a combination of both.

In the illustrated example, a host OS 186 includes a container 170A having a containerized utility 198A (block 302). In an example, the container 170A may have multiple containerized utilities (e.g., utility 198A-B). In another example, a container (e.g., container 170B) may only have a single containerized utility (e.g., utility 198C). The container may include a set of access control rules 188A (block 304). In an example, the set of access control rules 188A may specify which users are privileged. For example, the set of access control rules 188A may specify certain user IDs, group IDs, and/or resource usage profiles that are privileged. In other examples, additional identifiers may be used.

A user interface 301 may provide a request 240 to run a containerized utility 198A for a transaction (blocks 306 and 308). In an example, a user 230 may provide the request 240, which may include user credentials 232. For example, a user ID (e.g., UID 232A designating "user ID A") for the first user 230 may be provided with the request 240. The daemon process (e.g., security manager 180) may intercept the request 240 from the first user 230 to run the containerized utility 198A (block 310). In another example, the host OS 186 may issue the request 240 to the daemon process 180. Then, the daemon process 180 may retrieve credentials 232 associated with the user 230 (block 312). In an example, the credentials 232 associated with the first user 230 may become available to the daemon process 180 once the user 230 attempts to execute a command (e.g., RBD command 250). The credentials 232 may include a user ID (e.g., UID 232A), a group ID (e.g., GID 232B), a resource usage profile (e.g., RUP 232C), or the like. For example, the first user 230 may have a user ID "user A" and a group ID "group A1". Additionally the first user 230 may have a resource usage profile "profile X".

Then, the daemon process 180 may determine whether the credentials 232 match the set of access control rules 188A (block 314). For example, the daemon process 180 may determine whether one or more of the credentials 232 associated with the first user 230 match at least one of the access control rules 188A (e.g., UID 240A, GID 240B, and/or UID 240C). If the credentials 232 match the set of access control rules 188A, then the daemon process 180 may execute an RBD command 250 for the transaction to obtain a target RBD image 260 (blocks 316 and 318). Requiring user credentials 232 to match access control rules 188A before executing the RBD command 250 advantageously improves system security by preventing the user from executing the RBD command 250 before being authenticated, which prevents unauthorized users from accessing resources that do not belong to them. For example, previous techniques (e.g., setting labels) may enable a user to gain access to all RBD devices 268 of the system and execute RBD commands 250 on the RBD devices 268.

A file repository 192 may receive the RBD command 250 (block 320). Then, the file repository 192 may provide the RBD image 260 to the daemon process (blocks 322 and 324). The daemon process may retrieve the RBD image 260 from the file repository 192. For example, the daemon process 180 may receive the RBD image 260 from the file repository 192. In an example, the file repository 192 may be in a cloud. In another example, the file repository 192 may be on a host machine. The daemon process 180 may also build the target RBD 260 image from system cache. Then, the daemon process 180 may complete the transaction 270 (block 328). For example, the daemon process may format an RBD device 268. The user interface 301 may receive a notification that the request 240 is completed (block 330). Then, the daemon process 180 may record the transaction 270 in an audit log 280 (block 332). For example, the audit log 280 may include a record of successful transactions. Additionally, the audit log 280 may be used to track credentials such as user ID 232A, group ID 232B, and/or resource usage profiles 232C associated with the transaction 270. Additionally, the daemon process 180 may track access control rules (e.g., access control rules 188A) associated with each container (e.g., container 170A). The ability to track the user's 230 actions and system resources advantageously allows the system to limit user activities. For example, the user 230 may be limited if they use too much system memory within a short period of time.

If the credentials do not match the set of access control rules 188A, then the daemon process may prevent the execution for the RBD command for the transaction. In an example, the daemon process 180 may log or record unauthorized access (e.g., an attempt to access privileged containers from a non-privileged user). For example, the daemon process 180 may record the attempt in the audit log 280. Additionally, the daemon process 180 may use the record to blacklist the user and prevent subsequent access from the user, which advantageously prevents future security risks from the same user.

Figure 4:
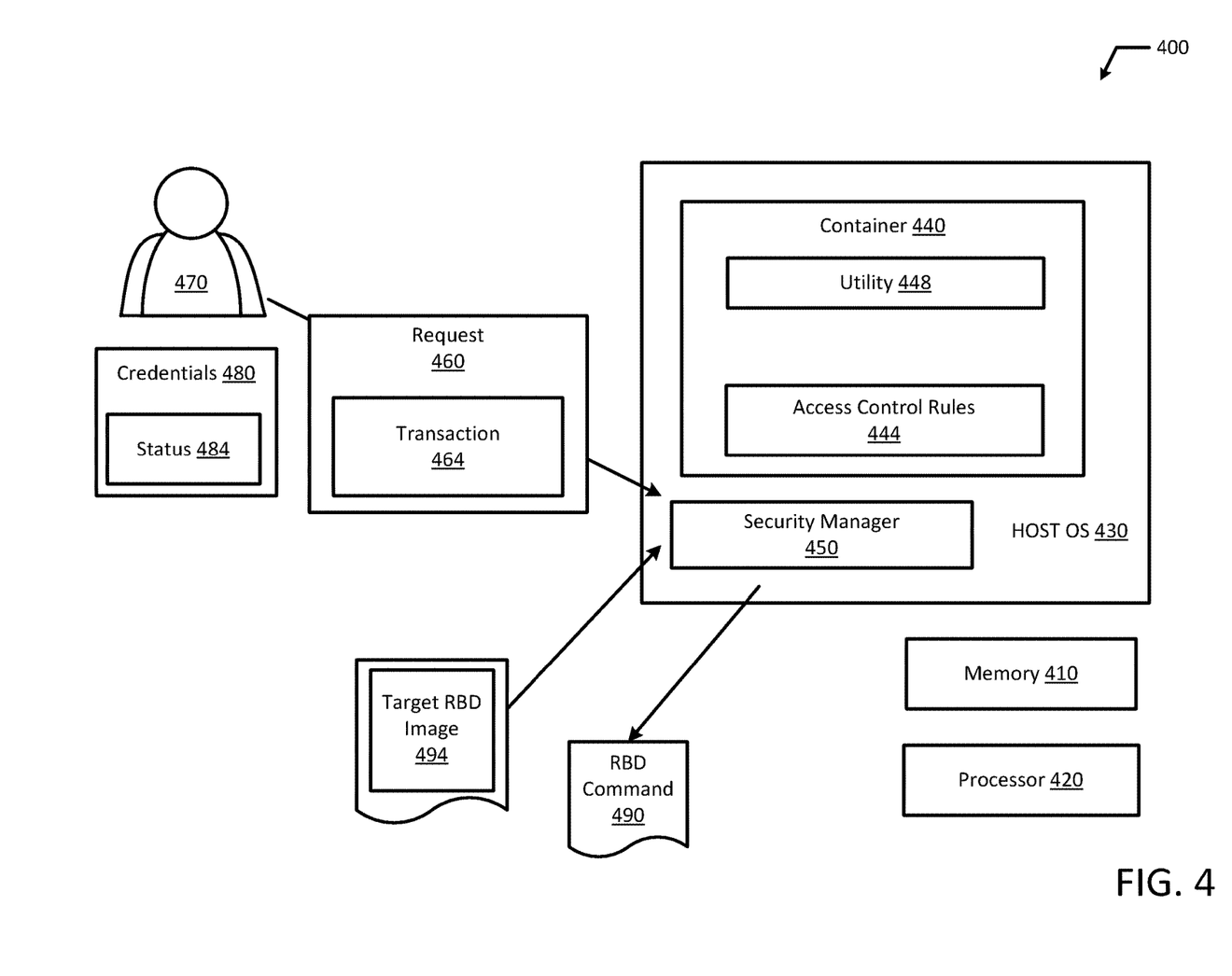
FIG. 4 illustrates a block diagram of an example access control system according to an example embodiment of the present disclosure.

FIG. 4 is a block diagram of an example access control system 400 according to an example embodiment of the present disclosure. The access control system 400 may include a memory 410 and at least one processor (e.g., processor 420) in communication with the memory 410. The access control system 400 may include a host OS 430 executing on the at least one processor (e.g., processor 420) and a first container 440 on the host OS 440. The first container 440 may have a first set of access control rules 444 and may include a first containerized utility 448. The access control system 400 may also include a security manager 450 running on the host OS 430. In an example, the security manager 450 may be a daemon process. The security manager 450 may run on the host OS 430 to receive a request 460 from a first user 470 to run the first containerized utility 448 to complete a transaction 464. The security manager 450 may retrieve first credentials 480 associated with the first user 470 and determine a status 484 of the first credentials 480 as one of privileged and non-privileged. The status 484 of the first credentials 480 is privileged if the first credentials 480 are included in the first set of access control rules 444, and the status 484 of the first credentials 480 is non-privileged if the first credentials 480 are not included in the first set of access control rules 444. Responsive to determining the status 484 as privileged, the security manager 450 may execute a rados block device (RBD) command 490 for the transaction 464 to obtain a target RBD image 494. The security manager 450 may retrieve the target RBD image 494. Additionally, the security manager 450 may record the transaction 464.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor;
a memory storing a first container having a first set of access control rules, wherein the first container includes a first containerized utility; and
a security manager configured to:
receive a request from a first user to run the first containerized utility to complete a transaction,
retrieve first credentials associated with the first user,
determine a status of the first credentials as one of privileged and non-privileged according to the first set of access control rules,
execute a block device command for the transaction to obtain a target image,
retrieve the target image, and
record the transaction.

2. The system of claim 1, wherein the security manager is a daemon process.

3. The system of claim 1, wherein the status of the first credentials is non-privileged if the first credentials are not included in the first set of access control rules, and wherein responsive to determining the status as non-privileged, the security manager prevents execution of the command for the transaction.

4. The system of claim 3, wherein the security manager records an unauthorized access attempt and blacklists the first user.

5. The system of claim 1, further comprising a second container having a second set of access control rules, wherein the second container includes a second containerized utility.

6. The system of claim 5, wherein the first set of access control rules include the first credentials associated with the first user and the second set of access control rules include second credentials associated with a second user.

7. A method comprising:
receiving, by a security manager, a request from a first user to run a first containerized utility of a container to complete a first transaction, wherein the container has a first set of access control rules;
retrieving, by the security manager, first credentials associated with the first user;
determining, by the security manager, a status of the first credentials of the first user as one of privileged and non-privileged according to the first set of access control rules;
executing, by the security manager, a command for the first transaction to obtain a target image;
retrieving, by the security manager, the target image; and
recording, by the security manager, the first transaction.

8. The method of claim 7, wherein the security manager is a daemon process.

9. The method of claim 7, wherein the status of the first credentials is non-privileged if the first credentials are not included in the first set of access control rules, and wherein the method further comprises preventing, by the security manager, execution of the command for the first transaction responsive to determining the status as non-privileged.

10. The method of claim 7, further comprising:
receiving, by the security manager, a second request from the first user to run a second containerized utility of a second container to complete a second transaction, wherein the second container has a second set of access control rules;

retrieving, by the security manager, first credentials associated with the first user;

determining, by the security manager, a second status of the first credentials of the first user as one of privileged and non-privileged according to the second set of access control rules;

executing, by the security manager, a second command for the second transaction to obtain a second target image;

retrieving, by the security manager, the second target image; and recording, by the security manager, the second transaction.

11. The method of claim 7, further comprising tracking, by the security manager, the first credentials, wherein the first credentials include at least one of a user ID, a group ID, and a resource usage profile.

12. The method of claim 7, wherein executing the command includes validating, by the security manager, that a target device belongs to the first user.

13. The method of claim 7, wherein receiving the request from the first user includes, responsive to the first user attempting to execute a command inside the first container, intercepting the request associated with the attempt.

14. The method of claim 7, wherein the request is received from the first user in response to a host OS issuing the request to the security manager.

15. The method of claim 7, wherein the first credentials become available to the security manager once the user attempts to execute a command.

16. The method of claim 7, wherein the security manager retrieves the target image from one of a first repository in a cloud and a second repository on a host machine.

17. The method of claim 7, wherein retrieving the target image includes building the target image from system cache.

18. The method of claim 7, wherein the security manager records the first transaction in an audit log.

19. A non-transitory machine readable medium storing a program, which when executed by a processor, causes a security manager to:

receive a request from a first user to run a first containerized utility of a first container to complete a first transaction;

retrieve first credentials associated with the first user;

determine a status of the first credentials of the first user as one of privileged and non-privileged according to the first set of access control rules;

execute a command for the first transaction to obtain a target image;

retrieve the target image; and record the first transaction.

20. The non-transitory machine readable medium of claim 19, which further causes the security manager to track the first credentials, wherein the first credentials include at least one of a user ID, a group ID, and a resource usage profile.

* * * * *